Oct. 11, 1927. 1,644,994
E. U. FOWLER
TREE SUPPORT
Filed Sept. 16, 1925
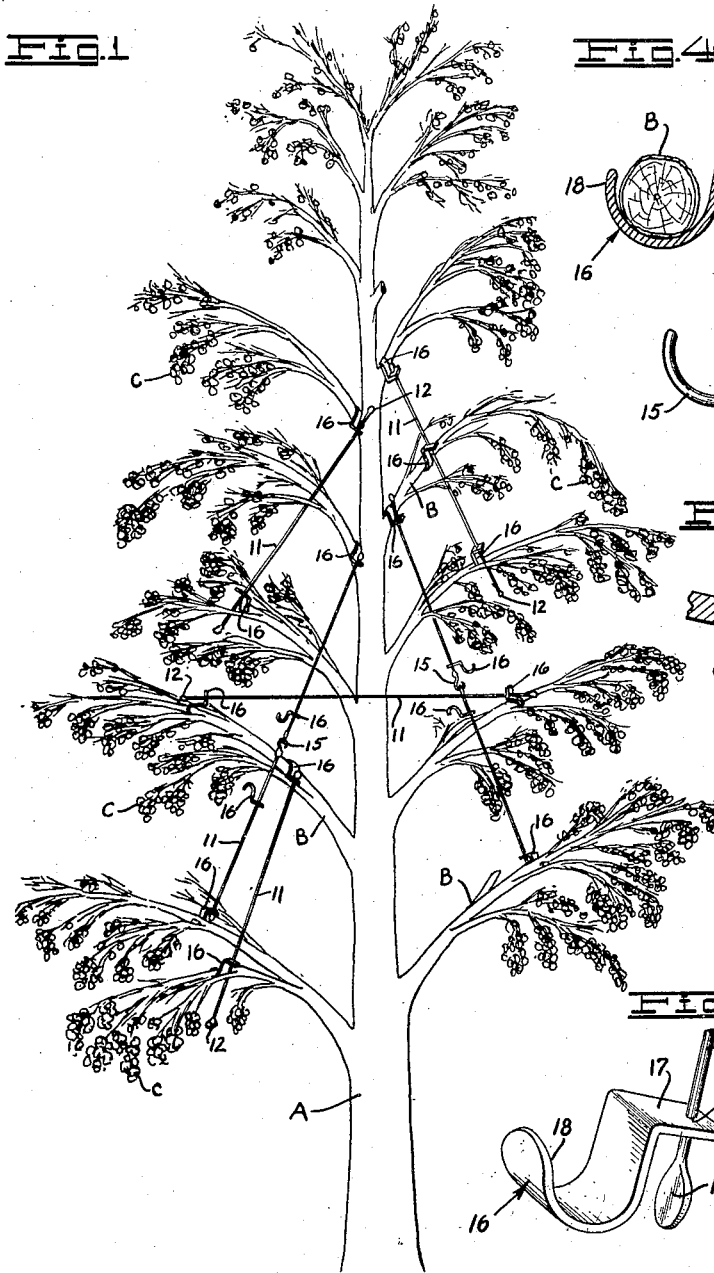
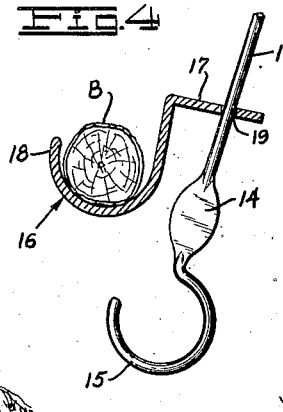
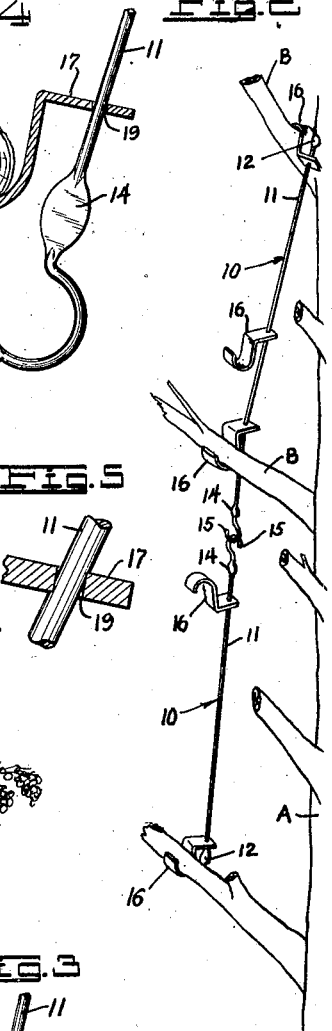
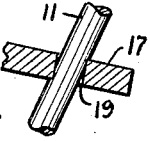
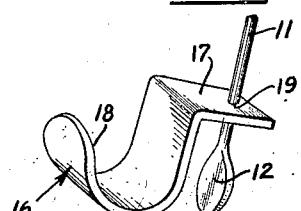
INVENTOR.
ERNEST U. FOWLER
BY
ATTORNEY.

Patented Oct. 11, 1927.

1,644,994

UNITED STATES PATENT OFFICE.

ERNEST U. FOWLER, OF SANTA ANA, CALIFORNIA.

TREE SUPPORT.

Application filed September 16, 1925. Serial No. 56,625.

This invention relates to tree supports.

The general object of the invention is to provide an improved tree support which is provided with adjustable supporting members whereby the support can be adjusted to suit different requirements.

Another object of the invention is to provide a tree support wherein a sustaining member is employed and wherein a plurality of adjustable supporting members such as hooks are mounted on the sustaining members so that they can be assembled in different positions.

Other objects of the invention will be apparent from the following description taken in connection with the accompanying drawings, wherein:

Fig. 1 is an elevation of a tree showing my improved supports thereon;

Fig. 2 is a fragmentary elevation through a portion of a tree showing my supports;

Fig. 3 is a fragmentary perspective detail showing one of the clips;

Fig. 4 is an enlarged sectional view showing the portions of the clip, and

Fig. 5 is a fragmentary sectional detail.

Referring to the drawing by reference characters, I have indicated my improved tree support generally at 10. This support includes a wire or rod 11 which is preferably made of rather stiff metal and which is shown as provided at its lower end with a flattened portion 12. Adjacent the upper end of the wire 11 I arrange a second flattened portion 14 and beyond this flattened portion 14 I show a hook 15, the purpose of which will be presently described.

Mounted upon the wire 10 I show a plurality of adjustable metal supporting members 16. Each of these members, as shown, is made from a flat strip of metal bent to provide a base portion 17 and a curved tree engaging portion 18 for engaging the limbs of the tree. The members 16 are preferably harder than the wire.

The base 17 is provided with an aperture 19 through which the wire or rod 11 is inserted before the flattened portions 12 and 14 are constructed.

The aperture 19 is of such a size that the supporting member will slide freely and rotate upon the rod when at right angles to the rod, but when the base is turned at an angle to the rod as shown in Fig. 5, the walls of the apertures will bind against the rod thus holding the supporting member in adjusted position. The two sides of the plate will engage opposite sides of the wire. The flattened portions 12 and 14 serve as stop members to prevent the supporting member from sliding off the ends of the wire 11.

It is frequently desirable that each of the supports 10 should brace a plurality of limbs and with my improved device I may do this by arranging as many of the hooks on each rod as desired.

When an extremely long support is desired I may couple two or more of the rods together as shown in Fig. 2 by interengaging the hooks 15.

Many fruit growers now prop their trees by inserting branches or timber beneath the trees. This practise is objectionable as the limbs can not be properly supported in this manner and very frequently the branches will break off at the prop. With my invention the limbs can be braced from the main trunk of the tree so that the likelihood of breakage is reduced to a minimum.

In supporting fruit laden trees the resiliency of the loaded limbs is such that a nice adjustment is required to secure the best supporting effect. If the branches are pulled up too tight they are likely to snap off at the point of support while if they are too loosely supported the fruit will be shaken off should a heavy wind blow. With my improved brace the proper tension can be given to the brace regardless of the distance between the supporting and supported limbs.

In Fig. 1 I have indicated a tree A and the branches of the tree are indicated at B. C indicates the fruit. The supports, it will be seen, are here arranged in such manner that the heavily laden limbs are supported in a suitable manner.

The supports may be arranged in a vertical or inclined direction or if desired some of the supports may be arranged horizontally as shown in Fig. 1. With my improved tree support the full bracing value of the support can be utilized since the adjustable feature allows the proper tension to be maintained in the support.

Having thus described my invention, I claim:

1. In a device of the class described, a wire, a tree supporting member, said tree supporting member comprising a metal plate comprising two parts, one part being flat and apertured to receive the wire and normally arranged at substantially a right angle to the wire, and the other part being bent to form a tree engaging part, said aperture being slightly larger than said wire.

2. In a tree supporting device, a wire, said wire having a flattened portion adjacent each end thereof, a hook adjacent one end of said wire, a plurality of supporting members movably mounted on said wire, said supporting members each having a base portion and a tree engaging portion, said base portions being apertured to receive said wire, said supporting members movable along said wire when said base portion is at right angles to the wire, and said base portions being adapted to engage the wire when the base portion is tilted with respect to the wire.

3. In a device of the class described a wire, a tree supporting member comprising a metal plate apertured to receive said wire, said metal plate being slidable along said wire, the aperture in said plate being of a size so that when the plate is moved out of a plane at right angles to the axis of the wire the two sides of the plate will engage opposite sides of the wire.

In testimony whereof, I hereunto affix my signature.

ERNEST U. FOWLER.